Figure 1:
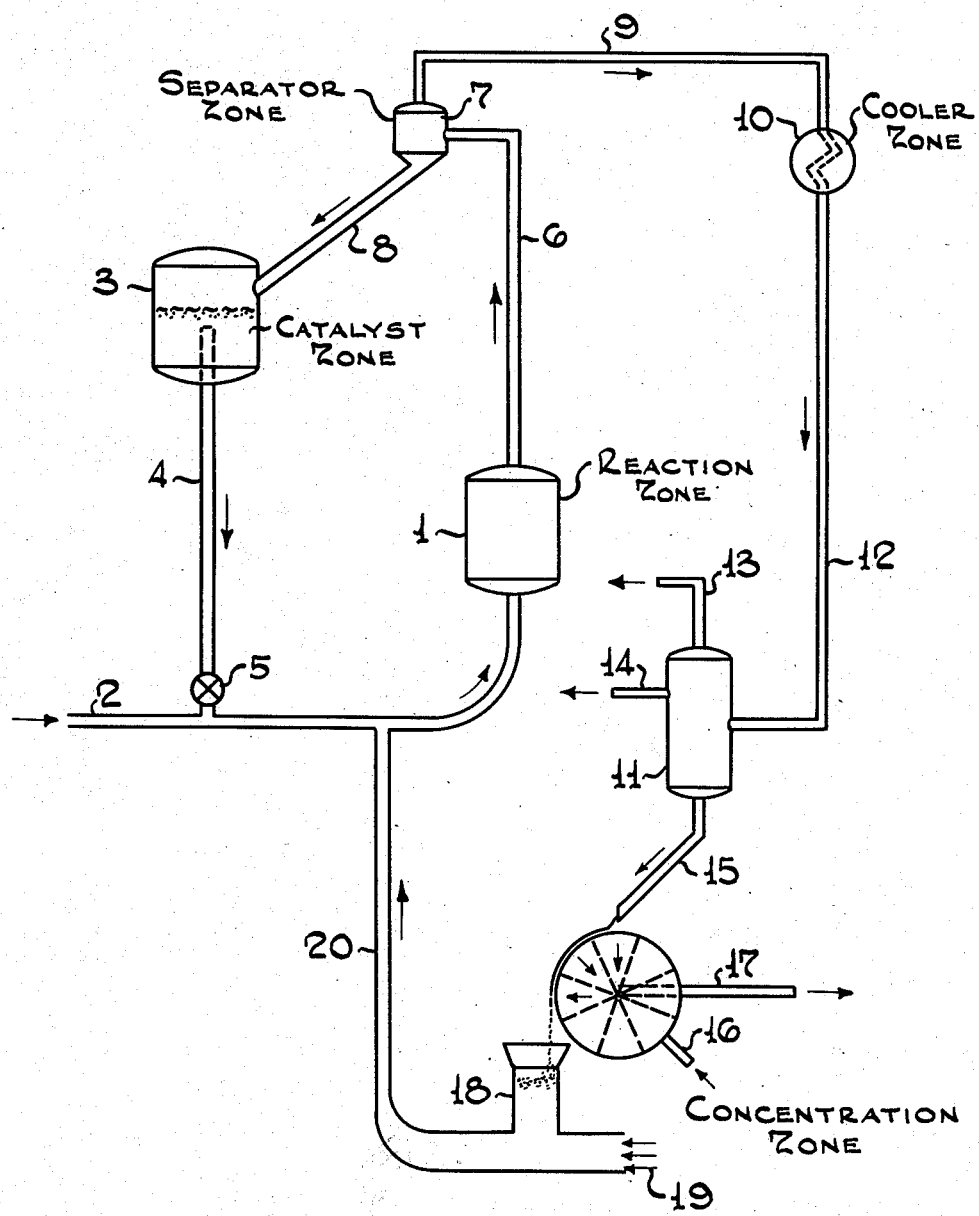

Patented Aug. 8, 1950

2,518,337

UNITED STATES PATENT OFFICE 2,518,337

SLURRY HANDLING

Robert W. Krebs, Baton Rouge, La., assignor to Standard Oil Development Company, a corporation of Delaware Application April 26, 1946, Serial No. 665,073

2 Claims. (Cl. 260—449)

1

The present invention is concerned with an improved process for the handling of catalysts. It is more particularly concerned with an operation in which catalyst is recycled to the reaction zone in a foam. The novel features of my invention are disclosed in the following specifications and claims, and in the drawings forming a part of said specifications.

It is well known in the art to use solid catalysts in powdered or fluid form for aiding and carrying out various chemical processes. In operations of this character, as for example in hydrocarbon cracking processes, solid catalyst having a particle size of from about 5 to 120 microns and higher is suspended in the vapors undergoing conversion. The fluidized state of the catalyst is effected by regulating or controlling the superficial velocity of the vapors in the reaction zone or zones. In a typical fluid catalyst operation the velocity of the vapors in the reaction zone is from about 0.2 to 5 ft. per second. Under these conditions there is formed a dense turbulent suspension of catalyst in vapors, which suspension may have a density of from 10 to 90% of the free settled density depending upon, among other factors, the velocity and viscosity of the vapors, the pressure, the particle size of the catalyst and the particle density of the catalyst.

In operations of the character described various problems are encountered. One major problem is the recovery of the catalyst, its regeneration when necessary and its return to the reaction zone. In catalytic cracking operations, the major portion of a catalyst is separated from the reacting vapors at the end of the desired contact time between the vapors and the catalyst. However, some minor proportion of the catalyst remains suspended in the vapors leaving the reaction zone and appears in the condensate as well as in other parts of the catalytic cracking system. This problem of contamination of the liquid product with powdered catalyst is also encountered in a hydrocarbon synthesis process where the catalyst is suspended in the reaction vapors during the conversion cycle. Furthermore, in operations of this latter character it is sometimes necessary to contact the whole of the catalyst with a liquid solvent in order to remove the wax formed on the catalyst.

My invention is concerned with transferring a catalyst suspended in a liquid slurry to a zone of gaseous suspension according to a procedure which is less expensive and more efficient than those procedures heretofore employed. My invention in essence involves converting the catalyst slurry in a physical manner to a foam or lather. The process of my invention may be readily understood by referring to the attached drawings, illustrating modifications of the same.

Figure 2:
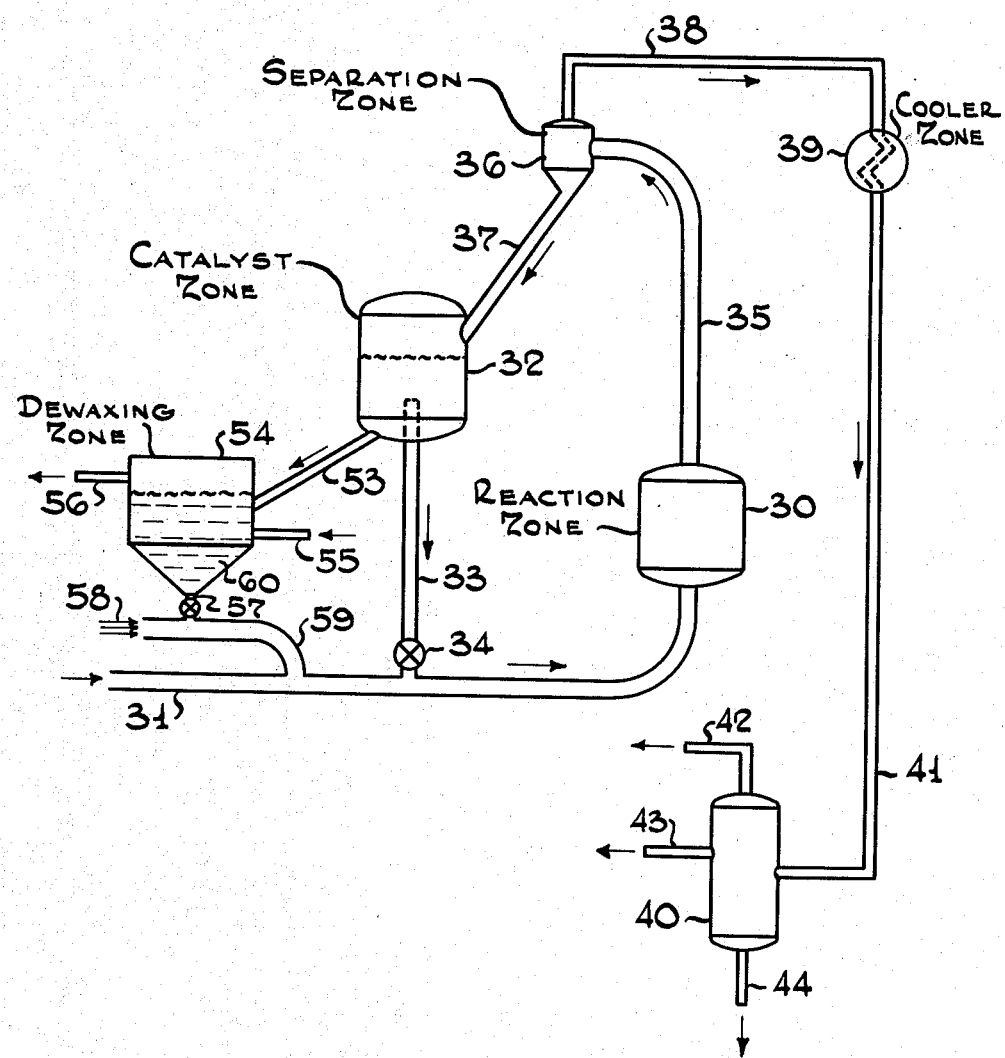

Figure 1 illustrates a modification of my invention in a catalytic cracking operation wherein a filter is employed, while Figure 2 illustrates a modification of my invention in a hydrocarbon synthesis operation wherein a solvent wax-removal tank is utilized.

Referring specifically to Figure 1. Feed gases at the desired temperatures and pressures are introduced into reaction zone 1 by means of feed line 2. The fluidized catalyst is introduced from catalyst zone 3 through standpipe 4 into feed line 2 and controlled by means of valve 5. The reaction gases, after the desired time of contact, are removed overhead from reaction zone 1 by means of line 6 and introduced into separation zone 7 which may comprise any desired number of cyclone separators or their equivalent. Most of the catalyst is removed from the vapors in separation zone 7 and returned to catalyst zone 3 by means of line 8. It is customary to provide a catalyst regeneration zone between separation zone 7 and catalyst zone 3, but this is, for the sake of simplicity, omitted from Figure 1. The reaction gases are removed from separation zone 7 by means of line 9 passed through cooling zone 10 and introduced into distillation and stabilization zone 11 by means of line 12. In zone 11 the reaction vapors are separated into any required number of fractions having the desired specifications. These fractions are withdrawn from distillation and stabilization zone 11 by means of lines 13 and 14. Although only two streams are shown being removed from zone 11, it is understood that any desired number of streams may be separated. The catalyst which is not separated in separation zone 7 appears in the residual bottom stream withdrawn from zone 11 by means of line 15.

In accordance with the present invention this stream is passed through a concentration zone 16, which for the purpose of illustration, is shown to be a rotary filter. This means may also comprise a Dorr thickener. Present practice is to withdraw stream 15 as a pumpable slurry, which slurry is returned to reaction zone 1 or to another point in the catalytic cracking operation. In accordance with my invention the slurry withdrawn from distillation zone 11 by means of line 15 is passed through concentration zone 16 and a substantial proportion of the oil removed by means of line 17. The catalyst in the form of a soft mud is dropped into receiving hopper 18 into which is injected a gas by means of nozzles or equivalent means 19. Conditions in the unit 18 are adjusted so that a froth or a foam is formed which is returned to the system by means of line 20.

Referring specifically to Figure 2. Synthesis feed gases are introduced into synthesis reaction zone 30 by means of line 31 at the desired temperatures and pressures. The fluidized catalyst is introduced into the feed gas stream from catalyst zone 32 by means of line 33 and controlled by means of valve 34. The reaction products together with the catalyst are removed overhead from reaction zone 30 by means of line 35 and introduced into separation zone 36. The catalyst is separated from the vapors in separation zone 36 and returned to catalyst zone 32 by means of line 37. The reaction vapors are withdrawn from separation zone 36 by means of line 38 cooled in zone 39 and passed to distillation zone 40 by means of line 41. In distillation zone 40 conditions are maintained to separate the desired streams 42, 43 and 44 having the desired specifications.

The distillate bottoms stream 44 will contain some catalyst escaping from separation zone 36. This catalyst may be concentrated and returned in the manner described in connection with Figure 1.

In an operation of this character the catalyst tends to build up wax and it is necessary at intervals to dewax the catalyst. In accordance with the present invention, the catalyst and wax are withdrawn from catalyst zone 32 by means of line 53 and passed to dewaxing zone 54. This zone is shown as a dewaxing washing tank but may comprise any other suitable or equivalent means. In dewaxing zone 54 the catalyst is treated with any suitable dewaxing solvent which is introduced by means of line 55 and withdrawn by means of line 56. In accordance with the process of the present invention the dewaxed catalyst settles in a thickening zone 60 and is withdrawn in the form of a concentrated, non-pumpable slurry from dewaxing zone 54 by means of line 57. This non-pumpable slurry is treated with a gas which is introduced by means of line 58 to form a pumpable froth or foam which is reintroduced into the system by means of line 59.

The process of the present invention may be widely varied. It may be applied to any operation wherein heretofore it was necessary to return solid material to a reaction zone by means of a slurry. It is, however, particularly adapted to operations of the type described or similar processes. By operating in accordance with the present process, for example, it is unnecessary to revaporize a relatively large quantity of oil or liquid which constitutes the carrying medium. Furthermore, by operating in accordance with my invention in the particular operations described, the amount of coke or undesired constituents forming in the reaction zone is appreciably lessened due to the fact that a considerably less quantity of carrying oil is returned.

The process of my invention is further illustrated by the following example:

*Example*

In a hydrocarbon synthesis operation in which the catalyst was dewaxed, the usual practice was to return the catalyst to the reaction zone by pumping the slurry, the concentration of which comprised about 1 to 2 lbs. of catalyst per gallon of solvents. In accordance with the present process sufficient additional solvent was removed to increase the concentration of catalyst from about 5 to 10 lbs. of catalyst per gallon of oil. This flowable but not pumpable slurry was then treated with sufficient hydrocarbon gases to form a froth or foam which was subsequently returned to the reaction zone.

By operating as described, the amount of solvent oil returned to the system per unit volume of catalyst was reduced to 20% of that formerly employed.

It is understood that the foam can be made from the heavy slurry by various means. One of the simplest is to introduce finely dispersed gases through a series of small nozzles or jets. Another is to employ agitation of the liquid, either with or without the addition of extraneous gases. In general, it is desirable to have the size of the bubbles from 10 to 100 times the size of the solid particles when these solid particles are in the range from about 5 to 100 microns. The relationship between the size of the bubbles and the size of the particles will vary somewhat, depending for example upon the density of the particles. The extent to which the pumpable slurry is concentrated before converting it to a foam will depend upon various factors. Generally, it is desirable to increase the catalyst concentration in the pumpable slurry by at least 100% or conversely to reduce the oil concentration to below 50%.

It is also within the purview of the present invention to use additives to aid in foam formation. Typical additives are oils such as pine oil, soaps, fatty acids or finely divided solids.

The present invention is not to be limited by any theory or mode of operation, but only in and by the following claims.

I claim:

1. In a hydrocarbon synthesis reaction wherein wax is formed on the catalyst and wherein said catalyst is dewaxed by treating with a suitable solvent, the process which comprises removing sufficient solvent from the catalyst to form a non-pumpable slurry, converting said non-pumpable slurry to a foam and returning said foam to the reaction zone.

2. Process in accordance with claim 1 in which said foam is produced by treating the non-pumpable slurry with a gas.

ROBERT W. KREBS.

REFERENCES CITED

The following references are of record in the file of this patent:

UNITED STATES PATENTS

| Number | Name | Date |
|---|---|---|
| 1,008,980 | Mills | Nov. 14, 1911 |
| 1,932,673 | Pier et al. | Oct. 31, 1933 |
| 1,972,948 | Payne | Sept. 11, 1934 |
| 2,002,997 | Herold et al. | May 28, 1935 |
| 2,057,402 | Tropsch | Oct. 13, 1936 |
| 2,392,798 | Kleiss | Jan. 8, 1946 |
| 2,414,736 | Gray | Jan. 21, 1947 |
| 2,447,149 | Wier | Aug. 17, 1948 |

FOREIGN PATENTS

| Number | Country | Date |
|---|---|---|
| 35,053 | Japan | Oct. 4, 1919 |
| 619,383 | Germany | Oct. 1, 1935 |

OTHER REFERENCES

Nikaido and Suzki Co., Chemical Abstracts, vol. 14, page 2561 (1920).

Murphree et al., National Petroleum News, Mar. 7, 1945, pages R-194, 195, 196, 198, 199, 202, 204.